(12) United States Patent
Morgan

(10) Patent No.: US 6,363,984 B1
(45) Date of Patent: Apr. 2, 2002

(54) TIRE TREAD PITCH SEQUENCING FOR REDUCED NOISE

(75) Inventor: Christopher D Morgan, Akron, OH (US)

(73) Assignee: Kumho & Co, INC, Kwangju (KR)

(*) Notice: Subject to any disclaimer, the term of this patent is extended or adjusted under 35 U.S.C. 154(b) by 0 days.

(21) Appl. No.: 09/426,257

(22) Filed: Oct. 25, 1999

(51) Int. Cl.[7] .................... B60C 11/03; B60C 113/00
(52) U.S. Cl. .................................................. 152/209.2
(58) Field of Search .......................... 152/209.2, 209.3

(56) References Cited

U.S. PATENT DOCUMENTS

| | | | |
|---|---|---|---|
| 1,956,011 A | * 4/1934 | Evans | |
| 3,989,780 A | 11/1976 | Vorih | 264/40.1 |
| 4,178,199 A | 12/1979 | Lippman et al. | 156/110 R |
| 4,327,792 A | 5/1982 | Landers | 152/209 R |
| 4,474,223 A | 10/1984 | Landers | 152/209 R |
| 4,598,748 A | 7/1986 | Campos et al. | 152/209 R |
| 4,721,141 A | 1/1988 | Collette et al. | 152/209 A |
| 4,777,993 A | * 10/1988 | Yamashita et al. | |
| 4,856,571 A | 8/1989 | Collette et al. | 152/209 R |
| 5,062,461 A | 11/1991 | Noguchi | 152/209 R |
| 5,269,357 A | 12/1993 | Killian | 152/209 R |
| 5,309,964 A | 5/1994 | Kogure | 152/209 R |
| 5,314,551 A | 5/1994 | Williams | 152/209 R |
| 5,371,685 A | 12/1994 | Bandel et al. | 364/505 |
| 5,383,506 A | 1/1995 | Kogure | 152/209 R |
| 5,690,760 A | 11/1997 | Brown, Jr. | 152/209 R |
| 5,996,660 A | * 12/1999 | Kakumu et al. | |

FOREIGN PATENT DOCUMENTS

EP 542493 * 5/1993

OTHER PUBLICATIONS

Varterasian, John H., "Quieting Noise Mathematically—Its Application to Snow Tires", Society of Automotive Engineers, Inc. pp. 1–12, May 1969.*

* cited by examiner

Primary Examiner—Steven D. Maki
(74) Attorney, Agent, or Firm—Paul E Milliken; Ray L Weber (57) ABSTRACT

A tire tread having design cycles or pitches in which the circumferential lengths of repeated pitches are randomly modulated in certain selected sequences to reduce the amount of noise generated by the tire tread when the tire rolls on a road surface. The pitch sequences include three different circumferential pitch lengths including a group having a largest number of medium length (M) pitches, a smallest number of shortest length pitches (S) and a medium number of longest length (L) pitches. In one embodiment, the ratio of the three different pitches are 0.8 for the smallest length pitch (S), 1 for the medium length pitch (M) and 1.2 for the longest length pitch (L). 100 pitch sequences are proposed with the sequence L M S M S L M L M L M L M L M M L M L M L M L M L M being the preferred sequence which provides the most noise reduction. Ninety nine other pitches are also within a range to provide an acceptable level of noise reduction in a tire tread.

14 Claims, 5 Drawing Sheets

TIRE TREAD PITCH SEQUENCING FOR REDUCED NOISE

FIELD OF THE INVENTION

This invention relates generally to tire treads and more specifically relates to tire treads in which the lengths of repeated design cycles or pitches are randomly modulated in certain selected sequences in order to reduce the amount of noise generated by the tire tread when the tire rolls on a road surface.

BACKGROUND OF THE INVENTION

It is well known that periodic placement of tread elements (called "pitches") causes the tire to produce annoying tonal sounds during motion when rolling on a surface and that randomly modulating the placement of different lengths of pitches breaks up the tonality of such generated sound by spreading the acoustic energy more evenly throughout the noise spectrum. "Pitch length" is a measure of the length from the leading edge of one base pitch to the leading edge of the next adjacent pitch in the circumferential direction of the tire. Such random modulation is referred to as "pitch sequencing" and is described in the publication "Quieting Noise Mathematically—Its Application to Snow Tires", S.A.E. Paper #690520, May 1969 by John H Varterasian.

Considerable investigation has been done in the past on various different techniques for arriving at many different ways of varying the pitch sequences of tire treads with the objective being noise reduction in a tire when rolling on a surface.

There are many patents which show and describe various pitch sequences and different techniques for selecting such pitch sequences. Typical examples of such patents are Lippman et al U.S. Pat. No. 2,878,852, Vorih, U.S. Pat. No. 3,926,238 and Landers, U.S. Pat. No. 4,474,223 which are briefly summarized in Williams U.S. Pat. No. 5,314,551. Examples of some later issued patents in this general field are Collette et al U.S. Pat. No. 4,721,141, Killian, U.S. Pat. No. 5,269,357, and Brown, Jr, U.S. Pat. No. 5,690,760.

The present invention provides an even further variation of pitch sequencing which can offer effective noise reduction in tire treads of various tread designs.

SUMMARY OF THE INVENTION

The present invention is directed to a tire having a tread with a plurality of load supporting elements, placed around at least one circumferential band portion of the tire, any such band portion having a plurality of pitches of three different lengths which define a preselected pitch sequence extending at least partially around the circumference of the tire, said pitches comprising a group having a largest number of medium length (M) pitches, a group having a smallest number of shortest length (S) pitches and a group having a medium number of longest length (L) pitches, the number of the M pitches being equal to the total number of S pitches plus the total number of L pitches, a segment of the circumferential section having one continuous sequence of LMSMSL pitches and the remainder of pitches in the circumferential section may be varied in at least 100 different sequences.

DESCRIPTION OF THE DRAWINGS

These and other advantages and features of the invention will hereafter appear for purposes of illustration, but not of limitation, in connection with the accompanying drawings, in which.

DESCRIPTION OF THE PREFERRED EMBODIMENTS

Figure 1:
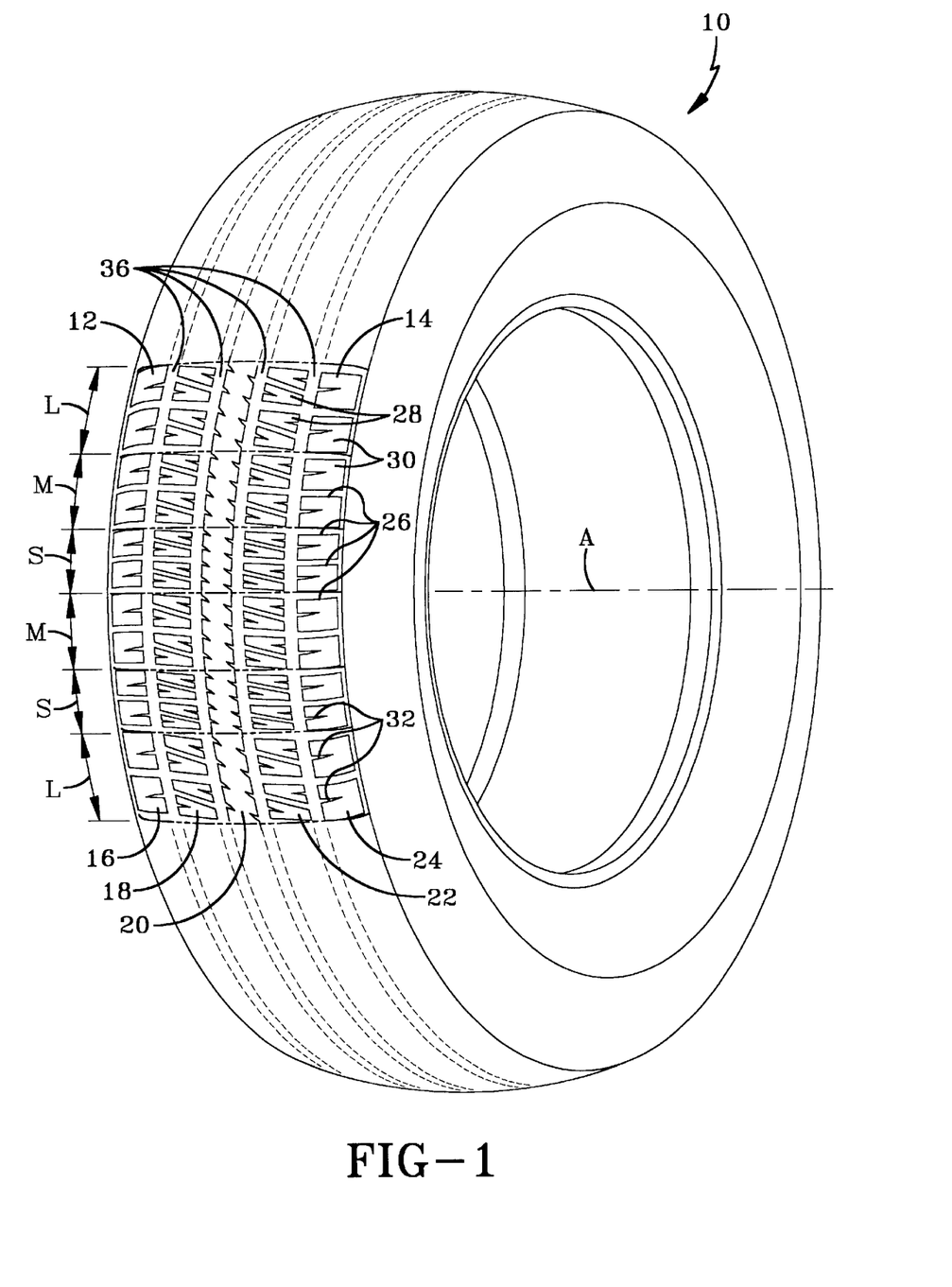
FIG. 1 is a perspective view of a tire having a tread pattern embodying the present invention.
Figure 2:
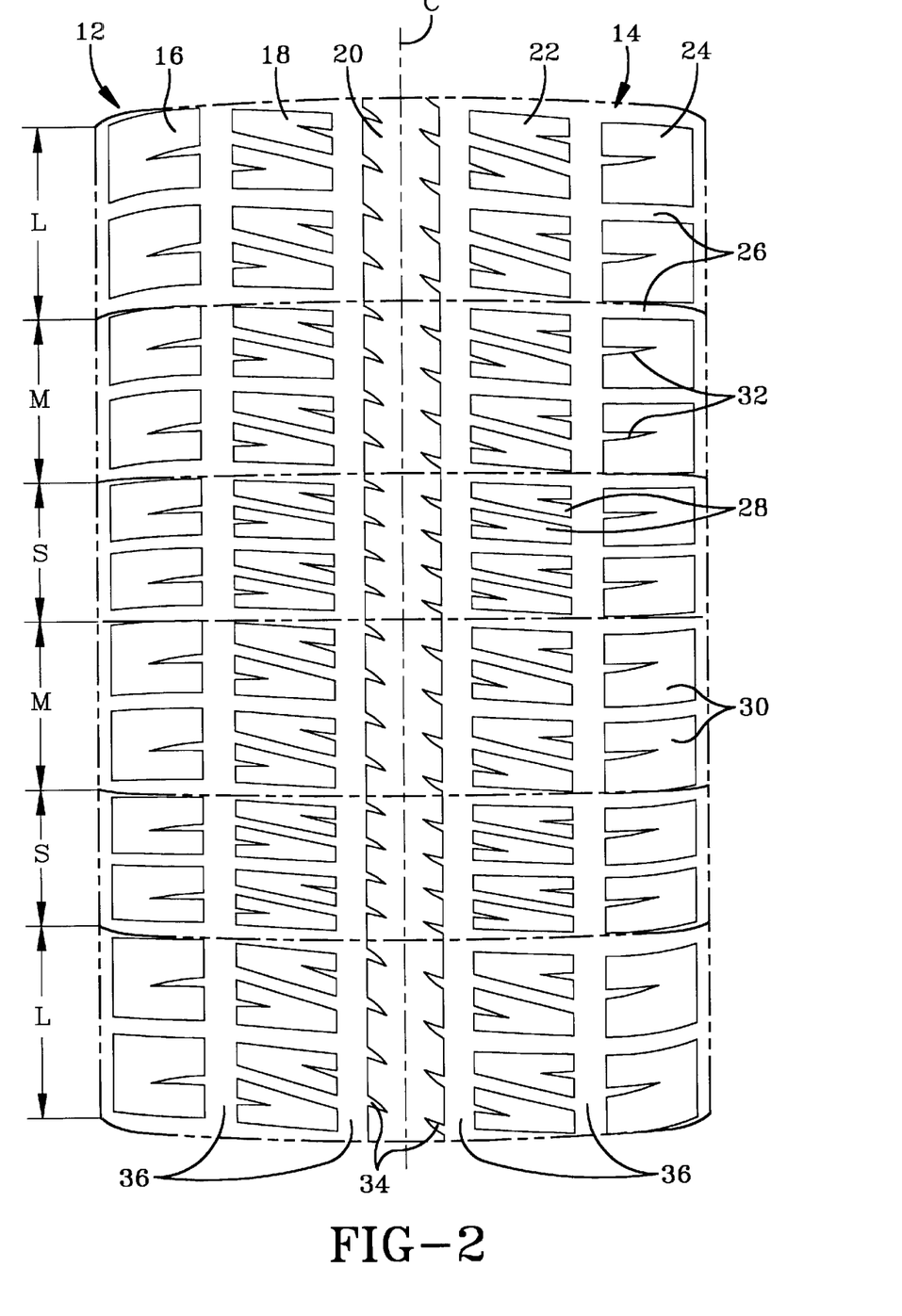
FIG. 2 is an enlarged plan view of a portion of the tread of the tire illustrated in FIG. 1.

Referring now to the drawings, FIGS. 1 and 2, shows a vehicle tire 10 having a tread with an outer circumferential tread 12. The tire 10 is adapted to rotate about a central axis A (shown in FIG. 1) during normal operation when rolling on a surface. The tread 12 forms one or more "circumferential band portions 14" depending upon the transverse width of the band portions 14. There may be one band portion 14 extending across the entire width of the tread 12 or there may be a plurality of band portions 14, which occupy a fraction of the transverse width of the tread 12, such as ½ of the width of the tread 12 or some other fraction thereof. In addition, there may be one band portion 14 extending around the entire circumference of the tire 10, or there may be a plurality of band portions 14 which occupy a fraction of the circumference of the tire 10, such as ½ of the circumference of the tire 10 or some other fraction thereof. The band portions 14 are simply designations of circumferential areas of the tread 12 which have certain "pitch sequences" extending partially or entirely around the circumference of the tire 10 as will be explained later.

In the particular embodiment shown in FIGS. 1 and 2, the tread 12 includes a plurality of circumferential ribs 16, 18, 20, 22, 24. The central rib 20, in this embodiment, is a continuous rib around the entire circumference of the tire and centered on a circumferential center line C lying midway at the transverse width of the tire tread 12. The other ribs are divided by transverse slots 26 into a plurality of load bearing elements or blocks 28 and 30. The blocks 28 and 30, for purposes of example, are formed with centrally located wedge shaped slots 32. The central rib 20 has similar slots 34 in each side edge thereof.

All the circumferential ribs, 16–24 are separated from each other by circumferential grooves 36.

This particular tread pattern of FIGS. 1 and 2 is merely given as a typical example of one that might utilize the invention, however many tread designs may use this invention including those of the type having large lugs such those shown in Vorih, U.S. Pat. No. 3,989,780 and Lippman et al, U.S. Pat. No. 4,178,199. Where the tread design is made up of individual lugs, no continuous ribs need be used and the pitch sequencing can apply to the lugs rather than continuous ribs.

The circumferential dimensions of the blocks 28 and 30 and the transverse slots 26 and the center rib 20 are varied around the circumference of the tread to provide noise reduction of the tire 10 rolling on a road surface.

While this broad concept is well known and various methods of tread variation are shown in prior art patents, the present invention discloses and claims a particular tread variation concept which provides effective noise reduction within a desirable range. To vary the circumferential dimension of blocks 28 and 30 and transverse slots 26 and center rib 20, the tread 12 or a circumferential band portion 14 of the tread is broken up into transversely divided design cycles or pitches indicated in FIGS. 1 and 2 by (M) for medium length pitches, (S) for the shortest length pitches, and (L) for the longest length pitches. As illustrated in FIGS.1 and 2, the circumferential length ratio of the pitches is S=0.8, M=1, and L=1.2.

In FIGS. 1 and 2, there is illustrated a pitch sequence of L M S M S L extending part of the distance around the circumference of the tread. These 6 pitches are followed by 20 more pitches making for a total of 26 pitches arranged in the sequence L M S M S L M L M L M L M L M M L M L M L M L M.

The above sequence was selected by computer simulation as one which would provide the best noise reduction from among 100 other pitch sequences all of which provided varying amounts of noise reduction.

Figure 4:
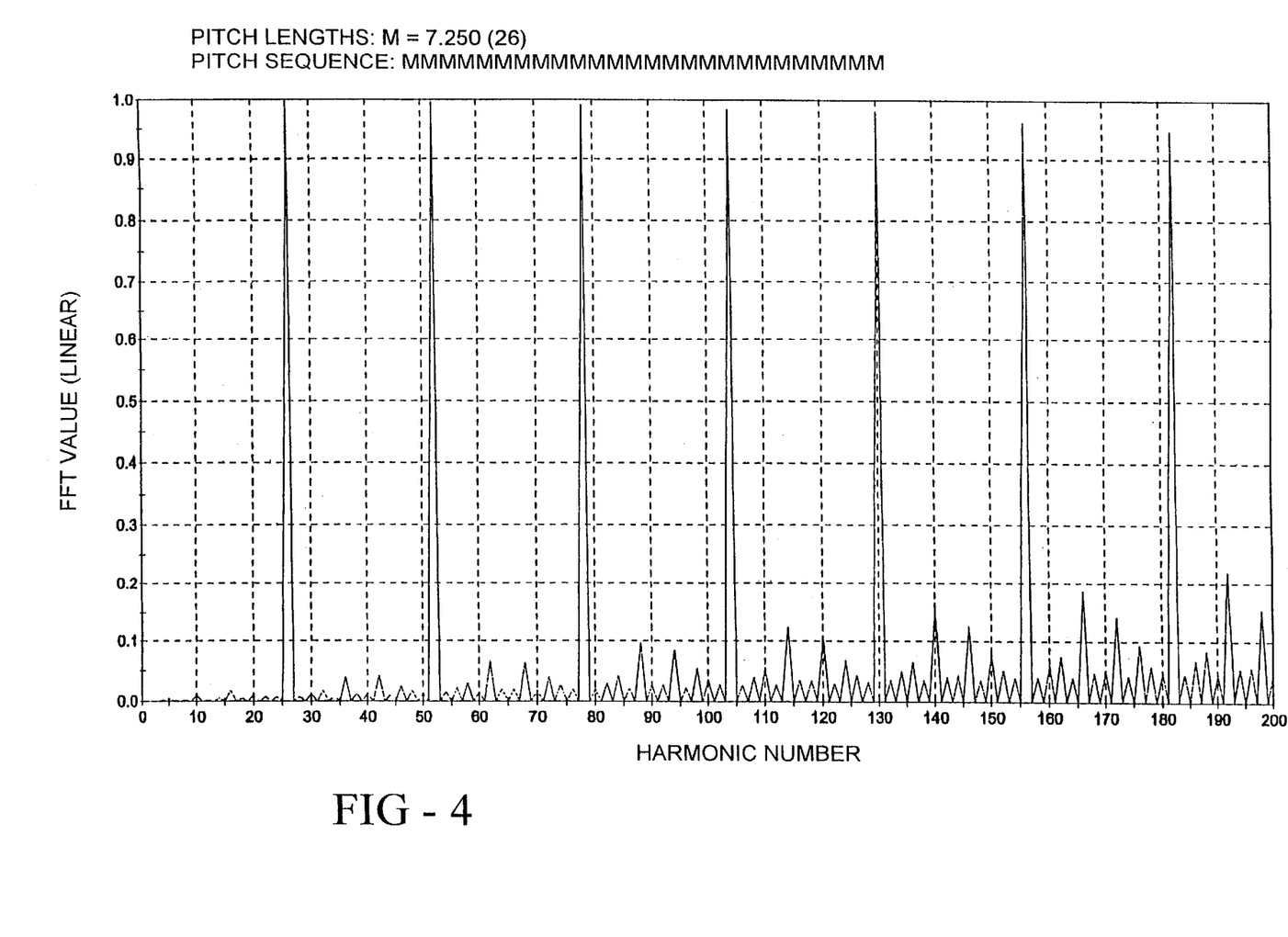
FIG. 4 is a graphical illustration of the Harmonic Analysis of the Impulse Function for a tire tread having all the pitch lengths identical around the entire circumference of the tire.

FIG.4 shows the visual computer readout of noise simulation of a pitch sequence of all M pitches having no variation in pitch length. This graphical representation shows a series of seven long spikes of between 0.998946 and 0.95000 in FFT (Fast Fourier Transform) Value on the chart connected by sawtooth line segments mostly below 0.1 FFT Value. Such a readout indicates a high level of tonal noise generated by the tread pattern with all pitch lengths of identical length around the circumference of the tire tread.

Figure 5:
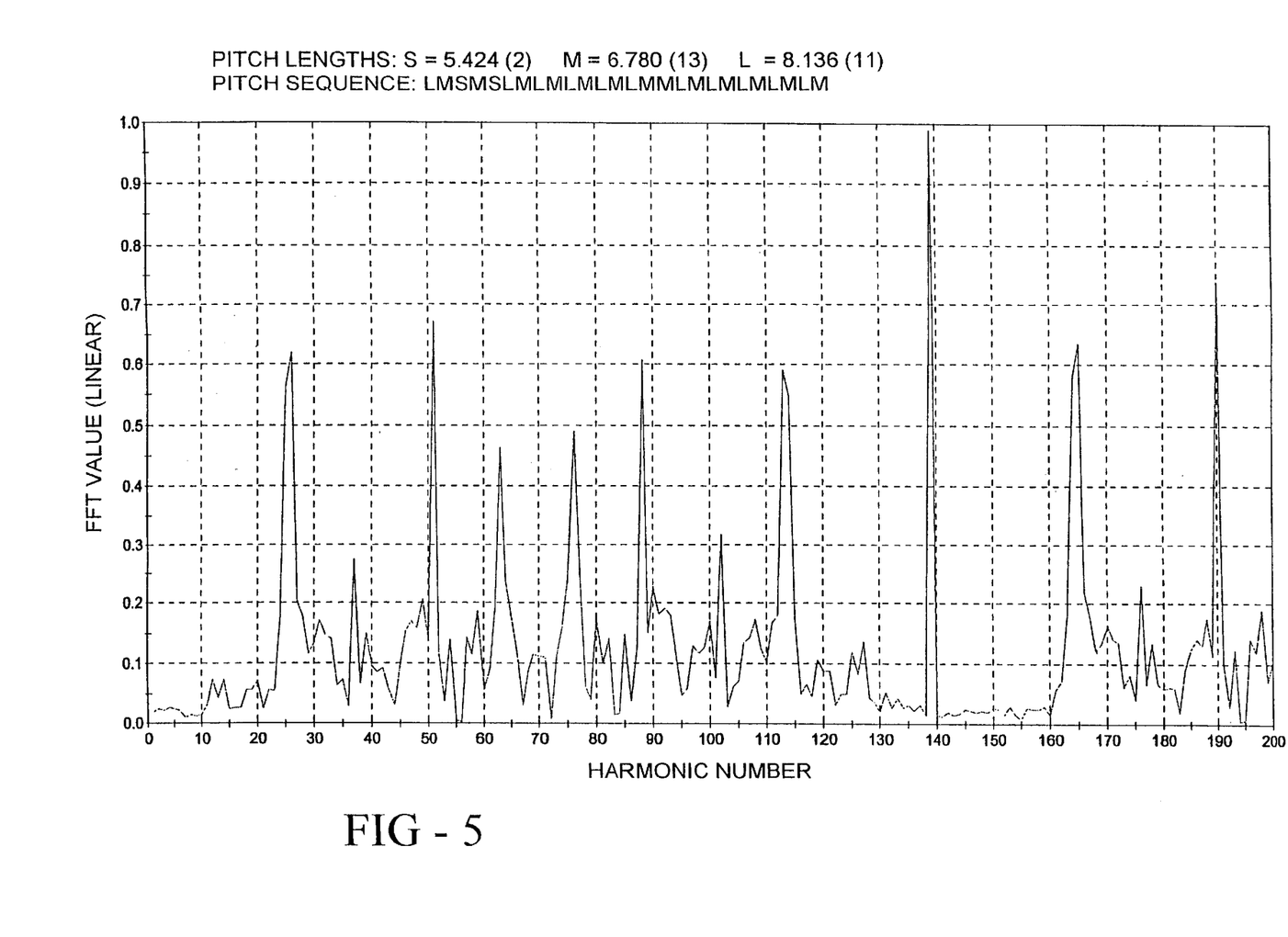
FIG. 5 is a graphical illustration of the Harmonic Analysis of the Impulse Function for a tire tread having three pitch lengths made in accordance with the present invention.

FIG. 5 shows the visual computer readout of noise simulation of a 26 pitch sequence having variation in pitch length as shown in FIGS. 1 and 2 and having the pitch sequence L M S M S L M L M L M L M L M M L M L M L M L M L M as described previously.

The graphical representation of FIG. 5 shows a series of only one long spike of 0.990796 in FFT Value, on the chart and a series of intermediate length spikes of approximately in the range of 0.6 in FFT Value connected by sawtooth line segments mostly below 0.2 FFT Value. Such a readout indicates a much lower level of noise generated by the varied pitch sequence of FIGS. 1 and 2 than a tread pattern with all pitch lengths of identical length around the circumference of the tire tread.

Computer analysis of many different pitch variations of a tire tread has shown that the following 100 sequences all provide a tread design within a reasonable range of reduced noise level. All 100 sequences contain the sequence L M S M S L followed by variations of 9 L pitches and 11 M pitches arranged in slightly varied sequences from each other. The following list of 100 pitch sequences starts with the pitch sequence producing the least noise and increases slightly in noise level with each successive pitch.

LMSMSLMLMLMLMLMMLMLMLMLM
LMSMSLMLMLMLMLMMLMLMLMML
LMSMSLMLMLMLMMLMLMLMLMML
LMSMSLMLMLMLMLMMLMLMLMLM
LMSMSLMLMLMLMMLLMMLMLMLM
LMSMSLMLMLMMLLMMLMLMLMLM
LMSMSLMLMLMMLMLMLMLMLMLM
LMSMSLLMMLMLMLMMLMLMLMML
LMSMSLLMMLMLMLMMLMLMLMLM
LMSMSLMLMLMLMMLLMMLMLMML
LMSMSLMLMLMLMLMMLMLMMLLM
LMSMSLLMMLMLMMLMLMLMLMLM
LMSMSLMLMLMLMMLLMMLMLMLM
LMSMSLMLMLMLMMLMLMLMLMML
LMSMSLLMMLMLMMLMLMLMLMML
LMSMSLMLMLMLMLMMLMLMLMML
LMSMSLMLMLMLMMLLMMLMLMLM
LMSMSLMLMLMLMMLMLMLMLMLM
LMSMSLLMMLMLMMLMLMLMLMLM
LMSMSLMLMLMLMLMMLMLMLMML
LMSMSLMLMLMMLLMMLMLMLMLM
LMSMSLMLMLMLMMLMLMLMLMML
LMSMSLMLMLMLMLMMLMLMMLLM
LMSMSLMLMLMLMMLLMMLMLMLM
LMSMSLLMMLMMLMLMLMLMLMLM
LMSMSLMLMLMMLLMMLMLMLMLM
LMSMSLMLMLMLMMLMLMMLLMLM
LMSMSLMLMLMLMMLLMMLMLMML
LMSMSLMLMLMLMMLMLMLMLMML
LMSMSLMLMMLLMMLMLMLMLMLM
LMSMSLMLMLMLLMLMMLMLMLMM
LMSMSLLMMLMLMLLMLMLMLMLMM
LMSMSLLMMLMLMLMLMMLMLMMML
LMSMSLLMMLMLMLMMLMLMLMMML
LMSMSLMLMMLMLMLMMLMLMLMLM
LMSMSLMLMLMMLMLMLLMMLMLM
LMSMSLMLMMLLMLMMLMLMLMLM
LMSMSLMLMLMMLLLMMLMLMLMLM
LMSMSLMLMLMLMLMLMMLMLMLM
LMSMSLMLMLMMLMMLMLMLMLMM
LMSMSLMLMLMMLMLMMLMLMLMM
LMSMSLMLMLMLMMLLMMLMLMLM
LMSMSLLMMLMLMLMLMMLMLMLM
LMSMSLMLMLMLMLMLMMLMLMLM
LMSMSLMLMLMLMMLLMMLMLMLM
LMSMSLMLMLMLMLMLMMLMLMML
LMSMSLMLMLMLMLMLMLMMLMLM
LMSMSLMLMLMMLMMLMLMLMLMM
LMSMSLMLMLMLLMMLMLMLMLMM
LMSMSLMLMLMLMLMLMMLMMLML
LMSMSLMLMLMLMLMLMLMLMMLML
LMSMSLMLMLMMLMMLMLMLMLMM
LMSMSLLMMLMLMLMMLMMLMLMM
LMSMSLMLMMLMLMLMLMLMLMLM
LMSMSLMLMLMLMMLMLMLMLMML
LMSMSLMLMLMMMLMMLMLMLMLM
LMSMSLMLMMLMLMMLMMLMLMLM
LMSMSLMLMLMMMLLMLMLMLMLM
LMSMSLLMMLMLMLMLMMLMLMLM
LMSMSLMLMLMMLMLMLMMLMLM
LMSMSLMLMLMLLMMLMLMLMLMM
LMSMSLMLMLMLMMLLMMLMLMLM
LMSMSLMLMLMMLMLMLMLMLMLM
LMSMSLMLMMLMLMLMMMLMMLM
LMSMSLMLMLMLMLMLMLMLMLMLM
LMSMSLMLMLMLMLMMLMLMLMLM
LMSMSLMLMMLMLMLMLMMLMLM
LMSMSLMLMLMMLMMLMLMLMLMM
LMSMSLMLMLMLLMMLMLMLMLMM
LMSMSLMLMLMLMMMLMMLMLMML
LMSMSLLMLMMLMLMLMLMLMLMLM
LMSMSLMLMLMMLLMMLMLMMLMM
LMSMSLMLMLMLMMLMLMLMMMML
LMSMSLMLMLMMLMLMMLMLMML
LMSMSLMLMLMLMMLMLMMMLMM
LMSMSLLMMLMLMLMLMLMLMMLLM
LMSMSLMLMMLMLMLMLMLMLMLM
LMSMSLMLMLMMMLMMLMMLMLML
LMSMSLMLMMLMMLMLMMLMLMLM
LMSMSLMLMLMLMLMLMLMLMMLML
LMSMSLMLMLMLMLMLMMLMLMLM
LMSMSLMLMMLMMLMLMLMLMLMM
LMSMSLMLMLMMLMLMLMLMLMLM
LMSMSLMLMLMMLLMMLMLMLMLM
LMSMSLMLMLMLMLMLMMMLLMML
LMSMSLMLMLMMLLMMLMLMLMLM
LMSMSLMLMLMLMMLMLMLLMLMM
LMSMSLLMMLMLMLMMLMLMLMLM
LMSMSLMLMLMLMMLMLMLMMLML
LMSMSLMLMLMLLMMLMLMLMLML
LMSMSLMLMLMLMLMLMLMLMMLML
LMSMSLMLMLMMLLMMLMLMLMLM
LMSMSLMLMLMLMLMLMMLMMLML
LMSMSLLMMLMLMMLLMMLMLMML
LMSMSLMLMLMLMLMLMMLMMLML
LMSMSLLMMLMLMMLMLMLMMLLM
LMSMSLMLMLMMLLMMLMLMMMLM
LMSMSLMLMLMMLMMLMLMLMLMM
LMSMSLMLMLMMLLMMLMLMMLML
LMSMSLLMMLMLMMLMLMLMMLLM
LMSMSLMLMLMMLMLMLMLMLMML
LMSMSLMLMLLMMLMMLMLMLMLM
LMSMSLMLMLMLMLMMLLMMLMML

LMSMSLMLLMMLMMLLMMLMLMLMLM
LMSMSLMLMLMLMLMLMLMMLMMLLM
LMSMSLLMMLMMLLMLMMLMLMLMLM
LMSMSLLMMLMLMMLMLLMMLMLMLM
LMSMSLMLMLMMLLMMLMLMLMLMML
LMSMSLMLMLMLMMLMLMLMLMLMMLLM
LMSMSLLMLMMLMLMMLMLMLMLMML
LMSMSLMLMLMLMMLMLMLLMMML
LMSMSLMLMLMLMLMMMLLMLMLM
LMSMSLMLMLMLMLMMLMMLLMLMLM
LMSMSLMLMLLMMMLMLMLMLMLMLM
LMSMSLLMMMLLMLMMLMLMLMLMLM
LMSMSLMLMLMLMMLLMMLLMMLMML
LMSMSLMLMLMLMLMMMLMLLMMMLLM
LMSMSLMLMLMLMLMMLLMMMLLMLM
LMSMSLMLLMMMLLMMLMLMLMLMLM
LMSMSLMLMMLLMLMLMMLMLMLMML
LMSMSLMLMLMMLLMLMLMMLMLMML
LMSMSLMLMLMLMMLLMLMMLMMLLM
LMSMSLLMMLMMLMLLMMLMLMLMLM
LMSMSLMLMLMLMMLLMMLMMLLMLM
LMSMSLMLMLMMLLMMLLMMLMLMML
LMSMSLMLMLMMLLMMLMLMMLLM
LMSMSLLMMLMMLMLMLMLMLMLMLM
LMSMSLMLMLMLMMLMLMLLMMLMML
LMSMSLMLMLMLMMLMLLMMLMMLLM
LMSMSLMLMLMLMMLMLMLMLLMMLM
LMSMSLMLMLMLMMLLMMLLMMLMLM
LMSMSLMLMLMMLLMLMLMMLMLMLM
LMSMSLMLLMMLMLMLMMLMLMLMLM
LMSMSLLMMLMLMLMMLLMMLMLMLM
LMSMSLMLMLMMLMLMLMLMLMLMLM
LMSMSLMLLMMLMLMLMMLMLMMLML

In addition computer analysis has shown that any sequence starting with L M S M S L followed by a variation of 9 L and 11 M will provide acceptable noise reduction performance.

Figure 3:
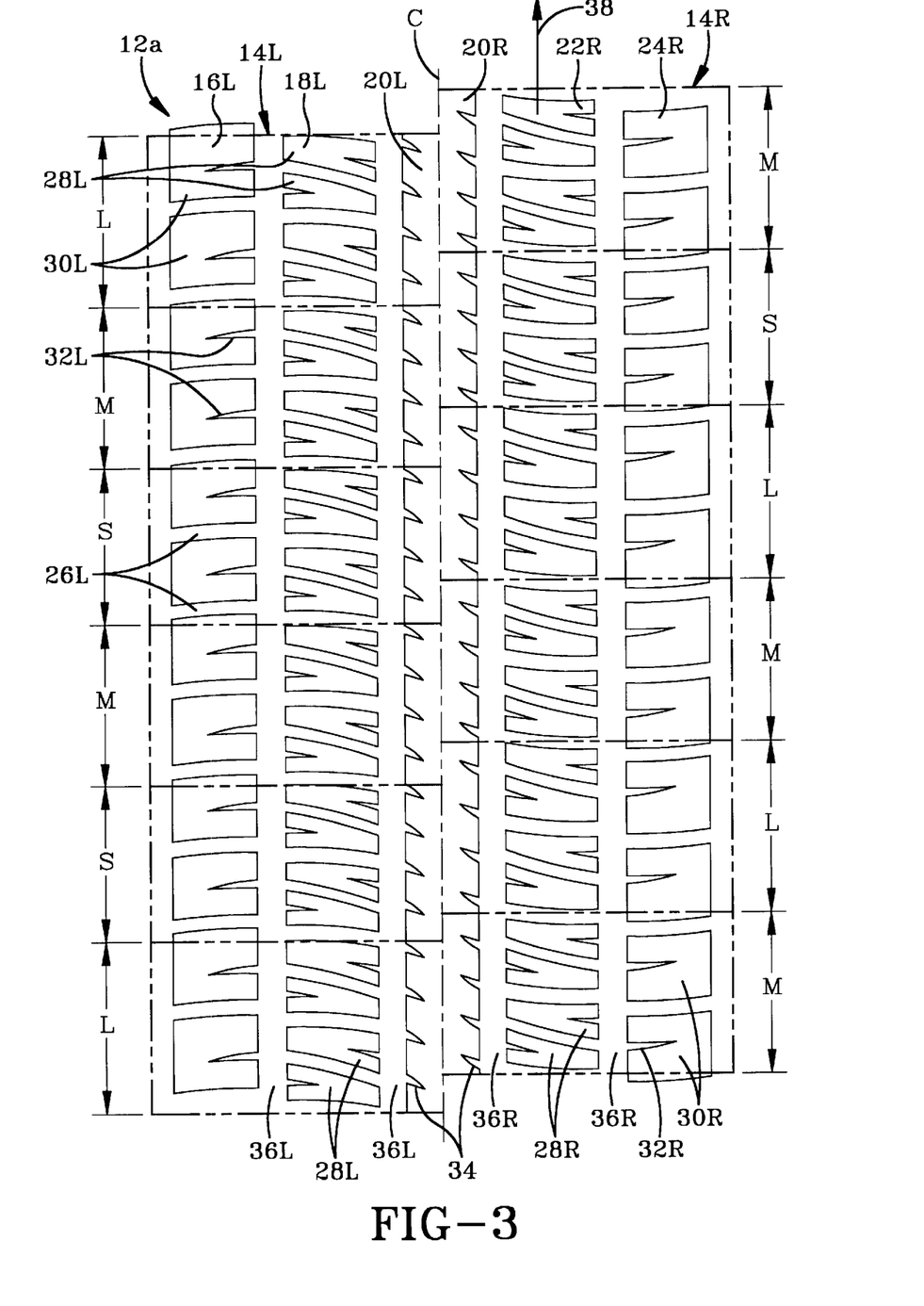
FIG. 3 is an enlarged plan view of a portion of a tread similar to that shown in FIG. 2 but having the tread patterns of the left and right half of the tread offset circumferentially from each other.

FIG. 3, shows a tire tread 12a similar to the tread 12 in FIGS. 1 and 2, except that the tread 12a is divided by a circumferential center line C into two circumferential band portions 14L and 14R each of which make up one half of the tread 12a.

For simplicity the ribs, transverse slots, blocks and wedge shaped transverse slots in FIG. 3 will bear similar numerals to those in FIGS. 1 and 2, but will be followed by the designation L or R depending upon whether they are located on the left or right half the tire tread 12a.

The tread pattern and pitch sequence of the band portion 14L is identical to that of the left half of the tread 12 in FIGS. 1 and 2. The right circumferential band portion 14R has been moved circumferentially in the direction of the arrow 38 by the distance of about three pitch sequences so that the pitches L M S have disappeared from the top of the band portion 14R and the pitches M L M have appeared at the bottom of 14R. This offsetting of the two halves of the tread provides further modulation of the noise generated by the tread 14a when rolling on a road surfaces.

It may also be seen that a similar result can be obtained by using a different pitch sequence on the left and right half of a tire tread or by using different pitch sequences on each circumferential rib.

Another embodiment of the invention is that any of the 100 pitch sequences listed herein having 26 pitches may be arranged to extend around only a first part of the circumference of the band portion 14 and a second pitch sequence around a second part of the circumference of the band portion 14. For example the previously listed pitch sequence of L M S M S L M L M L M L M L M M L M L M L M L M L M can be dimensioned to extend around a first part of the band portion 14 and a second pitch sequence such as S M S M L L M S S M M S M S S S can be used on a second part of the band portion 14. By adding 16 more pitches to the 26 pitches used in the first part of the band portion 14, there is a total of 42 pitch sequences around the entire circumference of the band 14. The 26 pitch sequence can be used as a starting basis for designing a tread having additional pitch sequences such as the 42 pitches of the previous example or some other number of pitches.

By using the 26 pitch sequence as a starting point, it has been found that the time required to determine the various additional pitch sequences to complete the entire circumference of the band is greatly reduced. Also, in many cases, only L and M pitch sequences are needed for any additional sequences added.

As previously stated, the same groups of pitch sequences disclosed herein can also be used on various other tread patterns regardless of whether they are rib and groove configurations or have larger lugs which form the tread design.

Other variations can be made in the tread pattern shown herein without departing from the scope of the invention so long as at least one of the pitch sequences disclosed herein are used.

What is claimed is:

1. A tire having a tread with a plurality of load supporting elements, placed around at least one circumferential band portion of the tire, any such band portion having a plurality of pitches of three different lengths which define a preselected pitch sequence extending at least partially around the circumference of the tire, said pitches comprising a group having a largest number of medium length (M) pitches, a group having a smaller number of shortest length (S) pitches and a group having a medium number of longest length (L) pitches, the number of the M pitches being equal to the total number of S pitches plus the total number of L pitches, a first segment of the circumferential band portion having a continuous pitch sequence of LMSMSL pitches and a second segment of the circumferential band portion having pitches which differ in sequence from the pitch sequence in the first segment, and wherein the pitch sequence around the entire circumferential band portion consists of 26 pitches which contain 2 S pitches, 13 M pitches and 11 L pitches.

2. A tire as claimed in claim 1 wherein more than one circumferential band portion of the tire has the Ditch sequence.

3. A tire as claimed in claim 1, wherein the S, M and L pitches have length ratios of 0.8, 1, and 1.2 respectively.

4. A tire as claimed in claim 1 comprising a pitch sequence of L M S M S L M L M L M L M L M M L M L M L M L M L M.

5. A tire having a tread with a plurality of load supporting elements, placed around a plurality of circumferential band portions of the tire, all such circumferential band portions having a plurality of pitches of three different lengths which define a preselected pitch sequence extending around the entire circumference of the tire, said pitches comprising a group having a number of medium length (M) pitches, a group having a number of shortest length (S) pitches and a group having a number of longest length (L) pitches, a first segment of the circumferential band portion having one continuous sequence of LMSMSL pitches and a second remainder segment of pitches in the circumferential band portion having only M and 1, pitches.

6. A tire as claimed in claim 5, wherein the pitch sequence consists of 26 pitches which contain 2 S pitches 13 M pitches and 11 L pitches.

7. A tire as claimed in claim 5, wherein the S, M and L pitches have length ratios of 0.8, 1, and 1.2 respectively.

8. A tire having a tread with a pattern formed by a plurality of load supporting elements, placed around at least one circumferential band portion extending entirely around the circumference of the tire, and extending transversely at least part of the distance across the width of the tire tread, any such band portion having a plurality of pitches of three different lengths which define a preselected pitch sequence extending around at least part of the circumference of the tire, said pitches comprising a group having a number of medium length (M) pitches, a group having a number of shortest length (S) pitches and a group having a number of longest length (L) pitches, the pitch sequence selected from the group consisting of the following:

LMSMSLMLMLMLMLMMLMLMLMLMLM,
LMSLSLMLMLMLMLMMLMLMLMML,
LMSMSLMLMLMLMLMMLMLMLMLMML,
LMSMSLMLMLMLMLMMLMLMLMLM,
LMSMSLMLMLMLMMLLMMLMLMLMLM,
LMSMSLMLMLMLMMLMLMLMLMLM,
LMSMSLLMMLMLMLMMLMLMLMLMML,
LMSMSLLMMLMLMLMMLMLMLMLMLM,
LMSMSLLMLMLMLMLMMLLMLMLMML,
LMSMSLLMLMLMLMLMMLMLMMLLMM,
LMSMSLLMMLMLMMLMLMLMLMLMLM,
LMSMSLMLMLMLMLMMLMLMLMMLLM,
LMSMSLMLMLMLMMLLMMLMLMLMML,
LMSMSLMLMLMLMLMMLLMMLMLMLM,
LMSMSLLMMLMLMLMLMMLMLMLMML,
LMSMSLMLMLMMLLMLMMLMLMLMLM,
LMSMSLMLMLMLMMLMLLMMLMLMLM,
LMSMSLMLMLMMLLMMLMLMLMLMLM,
LMSMSLMLLMMLMLMMLMLMLMLMML,
LMSMSLLMMLMLMMLLMMLMLMLMML,
LMSMSLLMMLMLMLMMLMLMLMMLLM,
LMSMSLMLMLMLMLMMLMLMMLML,
LMSMSLLMMLMLMMLMLMLMLMML,
LMSMSLMLLMMLMLMMLMLMLMLMLM,
LMSMSLMLMLMLMLMLMMLMLMML,
LMSMSLLMMLMLMMLLMMLMLMLMLM,
LMSMSLMLMLMLMMLMLMLMLMML,
LMSMSLMLMLMLMLMMLMLLMMLMML,
LMSMSLMLMLMLMLMMLMMLLMLM,
LMSMSLMLMLMLMLMLLMLLMLMLML,
LMSMSLMLMLMLMMLLMMLMMLLM,
LMSMSLMLLMMLMMLMLMLMLMLM,
LMSMSLLMMLMMLLMMLMLMLMLM,
LMSMSLMLMLMLMMLMLMMLLMLM,
LMSMSLMLMLMMLLMMLMLMLMML,
LMSMSLMLMLMLMMLLMMLMLMMLLM,
LMSMSLMLMLMLMMLMLLMMLMLMML,

LMSMSLMLMLMLMLMMLMLLMMLMLM,
LMSMSLMLMLMLMMLLMLMMLMLMLM,
LMSMSLLMMLMLMLMLMMLMLMLMLM,
LMSMSLLMMLMLMLMLMMLMLMMLML,
LMSMSLLMMLMLMLMMLMLMLMMLML,
LMSMSLMLLMMLMLMLMMLMLMLMML,
LMSMSLLMMLMLMLMMLLMMLMLMML,
LMSMSLLMMLMLMLMLMMLMLMMLLM,
LMSMSLMLMLMLMMLMLMLMLMMLML,
LMSMSLMLMMLLMLMLMMLMLMLMLM,
LMSMSLMLMLMLMMLMLMLLMMLMLM,
LMSMSLMLMMLLMLMMLMLMLMLMLM,
LMSMSLMLMLMMLLMMLMLMLMLM,
LMSMSLMLMLMMLMLLMMLMLMLMLM,
LMSMSLMLMLMMLMLMLLMMLMLMLM,
LMSMSLMLMLLMMLMMLMLMLMLMML,
LMSMSLMLLMMLMLMMLMLMLMMLLM,
LMSMSLLMMLMLMMLMLMMLLMLMML,
LMSMSLMLMLMLMLMMLMLMMLLMML,
LMSMSLMLMLMLMLMLMMLMLMLMML,
LMSMSLLMMLMLMMLLMMLMLMMLML,
LMSMSLLMMLMLMMLMLLMMLMLMML,
LMSMSLMLMLMLMLMMLMMLLMML,
LMSMSLLMMLMMLLMLMMLMLMLMML,
LMSMSLMLMLMLMLMMLMLMMLLM,
LMSMSLMLMMLLMLMMLMLMLMLMML,
LMSMSLMLMLLMMLMLMLMLMLMLM,
LMSMSLMLMLMLMMLLMMLMML,
LMSMSLMLMLMLMLMMLMLLMMML,
LMSMSLMLMLMLMLMMMLLMLMLM,
LMSMSLMLMLMLMLMMLMMLLMLMLM,
LMSMSLMLMLLMMMLMLMLMLMLM,
LMSMSLLMMMLLMLMMLMLMLMLMLM,
LMSMSLMLMLMLMMLLMMMLLMLM,
LMSMSLMLLMMMLLMMLMLMLMLM,
LMSMSLMLMMLLMLMLMMLMLMML,
LMSMSLMLMLMMLLMLMMLMLMML,
LMSMSLMLMLMLMMLLMLMMLLMLM,
LMSMSLLMMLMMLMLLMMLMLMLM,
LMSMSLMLMLMMLLMMLLMLMML,
LMSMSLMLMLMMLLMMLMLMMLLM,
LMSMSLLMMLMMLMLMLMLMLMLM,
LMSMSLMLMLMMLMLLMMLMML,
LMSMSLMLMLMLMMLMLLMMMLLM,

LMSMSLMLMLMLMLMMLMLMLLMMLM,
LMSMSLMLMLMLMMLLMMLLMMLMLM,
LMSMSLMLMLMMLLMLMLMMLMLMLM,
LMSMSLMLLMMLMLMLMMLMLMLMLM,
LMSMSLLMMLMLMLMMLLMMLMLMLM,
LMSMSLMLMLMMLMLMLMLMLMLMLM, and
LMSMSLMLLMMLMLMLMMLMLMMLML.

9. A tire as claimed in claim 8 wherein the preselected pitch sequence extends around a first part of the circumference of the band portion and a second pitch sequence extends around a second part of the circumference of the band portion.

10. A tire as claimed in claim 8, wherein the preselected pitch sequence extends around the entire circumference of the band portion.

11. A tire as claimed in claim 8 wherein each of a plurality of circumferential band portions of the tire, have the preselected pitch sequence.

12. A tire as claimed in claim 8 wherein at least one circumferential band portion of the tire, has the preselected pitch sequence and at least one other circumferential band portion has a different pitch sequence.

13. A tire as claimed in claim 8 wherein one circumferential band portion forming a left half of the tire tread has the preselected pitch sequence and another circumferential band portion forming a right half of the tire tread has a different selected pitch sequence.

14. A tire as claimed in claim 8 wherein a first circumferential band portion forming a left half of the tire tread has the preselected pitch sequence and a second circumferential band forming a right half of the tire tread has an identical pitch sequence but which is offset circumferentially from the first circumferential band portion so that the M, S and L pitches of the first circumferential band are not aligned transversely with the M, S and L, pitches of the second circumferential band.

* * * * *